July 28, 1936.   J. B. HENDERSON   2,049,375
AUTOMATIC STEERING CONTROL
Filed Nov. 8, 1934   2 Sheets-Sheet 1

J. B. HENDERSON
INVENTOR.

BY Blair Kilcoyne
HIS ATTORNEYS.

July 28, 1936.                J. B. HENDERSON                2,049,375
                          AUTOMATIC STEERING CONTROL
                            Filed Nov. 8, 1934         2 Sheets-Sheet 2

J. B. HENDERSON.
INVENTOR

BY Blair Kilcoyne.

HIS ATTORNEYS.

Patented July 28, 1936

2,049,375

UNITED STATES PATENT OFFICE 2,049,375

AUTOMATIC STEERING CONTROL

James Blacklock Henderson, London, England

Application November 8, 1934, Serial No. 752,182
In Great Britain November 10, 1933

8 Claims. (Cl. 244—29)

My invention relates to air and sea craft which are subjected to the action of external forces and are provided with mechanism for controlling the direction of a certain axis fixed to the craft, for example the fore-and-aft axis of a ship which is controlled in direction by the steering gear, the vertical axis of a ship controlled by anti-rolling tanks or moving weights, or the vertical axis of an aeroplane, airship or submarine controlled by moving the appropriate rudders.

In each case the problem is the same; the craft is subjected to the action of external couples of a periodic or fluctuating character which disturb the direction of a certain axis in the craft, and a compensating couple has to be applied automatically to balance the external couple as quickly as possible in order to annul the velocity which the craft has acquired from the action of the external couple and to restore the axis in question to the direction from which it has deviated.

In each case the craft is provided with a "direction-couple-mechanism" for applying couples to the craft in a plane parallel to said axis and fixed to the craft in order to alter the direction of the axis in question, and my invention consists broadly in applying to this mechanism a relay control having three components varying respectively with the angular displacement, the angular velocity and the angular acceleration of the axis in question, in the plane of the directing couples, so that the craft is constrained to move in a damped oscillation towards zero displacement of the axis irrespective of the action of the external couples.

In my United States Patent No. 1,765,583, dated June 24, 1930, I described a system of controlling the steering of ships by measuring the angular acceleration and the angular velocity of yaw by means of a constrained gyroscope, and by combining these measurements with the deviation from the course, determined by the gyro-compass, I arranged the control of the helm so that the ship is constrained to follow a damped oscillation towards zero deviation irrespective of the action of external forces due to waves, wind or tides.

My present invention consists of improvements in that system which extend its usefulness by making it applicable to all craft, whether fitted with gyro-compasses or not, and make it applicable to the control of the direction-control-mechanism of craft of all kinds, such as the horizontal rudders of submarines or aircraft for controlling pitching or height or depth; or the trim or anti-rolling mechanism of ships, submarines or aircraft. My invention also comprises improved means of measuring the angular acceleration and an improved form of gyroscope of a simple type. In general my invention consists of a gyroscopic relay mechanism of a robust type suitable for use on craft of all kinds for the automatic control of any directional couple mechanism on the craft, which will restore the direction of the disturbed axis on the craft in minimum time, which can be made at a fraction of the cost of the gyro-compass alone, and which can be made on any scale to suit the lightest of craft. In addition the mechanism is of a type requiring no expert attention in its working or maintenance.

According to my invention I measure on board the craft the angular displacement, angular velocity and acceleration of the axis in the plane of the directing couples and I combine the three in the relay mechanism in a certain manner and in certain proportions and apply the sum to actuate the directing-couple-mechanism, so that the given axis in the craft is continuously constrained to move in a damped oscillation toward zero displacement. By these means will the deviation of the axis be kept a minimum.

The same type of relay mechanism may be used for the control of steering, rolling or pitching, each relay being similarly placed relatively to the axis whose direction has to be controlled and the plane of the directing couples. It will therefore be sufficient if I describe my relay mechanism in its application to the steering control of a ship or air-craft, that is controlling the direction of the fore and aft axis of the craft by moving the vertical rudder.

The automatic steering gears employed up to the present start with the gyro-compass as datum of control and apply to the helm a displacement proportional to the deviation of the ship from her course, together with an additional displacement proportional to the angular velocity of yaw, so as to check the swing of the ship as she approaches her course. I shall call the former "deviation" helm and the latter "check" helm. In the absence of any external disturbing forces, if the helm torque is proportional to the helm angle, the equation of motion of the ship towards her course when displaced therefrom would be given by $$\theta'' + 2A\theta' + (A^2 + B^2)\theta = 0$$

wherein $\theta$, $\theta'$ and $\theta''$ represent respectively the deviation, the angular velocity and the angular acceleration of yaw, A being the damping coefficient of the oscillation and B the periodicity of the undamped oscillation. If T be the period of this oscillation then $$B = 2\pi/T$$

The period T differs according to the size of the ship and the ratio of helm displacement to deviation from the ship's course.

When a wave strikes such a ship causing a yaw, there is no appreciable attempt to stop the yaw until a considerable angular velocity has been attained, when the check helm component becomes effective. To stop or prevent a yaw due to a wave, it is necessary to apply immediately an equal and opposite couple by means of the helm to balance the wave couple. This is obviously impossible, but to make the resulting yaw as small as possible, it is necessary to deflect the helm as quickly as possible in proportion to the angular acceleration of the ship and in the direction to stop the acceleration. I therefore introduce a mechanism for measuring the angular acceleration. I measure on board the three variable $\theta$, $\theta'$ and $\theta''$ and I combine them in such a way that $$\theta'' + 2A\theta' + (A^2 + B^2)\theta = S$$

I control the steering engine by means of the sum S in such a way that if S is zero the helm remains stationary and if S is positive or negative the helm is moved in the direction to make S zero; and continues to move until S is zero or at least very small. With such a control the ship will move in a calm sea in the same damped oscillation as is described above as present practice, but in a seaway, when buffeted about by waves, the wave couples will be used when helpful and will be quickly balanced when adverse, and at all times the ship will approach her specified course in the same damped oscillation in the minimum time permissible by the initial conditions. Steady couples due to winds or tides and periodic couples will alike be balanced and the ship kept to her course by the action of the relay alone.

I also apply an additional hand adjustment to S to provide means for changing the ship's course.

To carry out my invention in a manner which will be applicable to all craft whether fitted with the gyro-compass or not, I measure the angular velocity of the ship in the plane of the deck by means of a constrained gyroscope with its rotor axis preferably fore and aft in the ship and supported on trunnions in the athwart-ships direction or otherwise constrained so that the rotor is forced to partake of the yawing motion of the ship. The gyro can pitch through a small angle relatively to the deck, such motion being constrained by springs. I prefer to restrict this pitching motion of the gyro to a few minutes of arc by stops which act as electric contacts and control the relay motor which actuates the springs and pulls the gyro off the stop thereby breaking the contact. The spring force is then proportional to the angular velocity of yaw $\theta'$, and the spring torque L on the gyro, the angular momentum $I\Omega$ of the gyro and the angular velocity of yaw $\theta'$ are connected by the equation $$L = I\Omega\theta'$$

I measure $\theta$ the deviation from the course by integrating $\theta'$ with respect to time, and $\theta''$ the acceleration by differentiating $\theta'$ with respect to time or I measure $\theta'$ and $\theta''$ preferably simultaneously in a new manner, and then I combine the three variables in the proper rates to represent the above equation, the sum of the three terms being S. This will be more clearly understood by reference to the mechanism.

Figure 1:
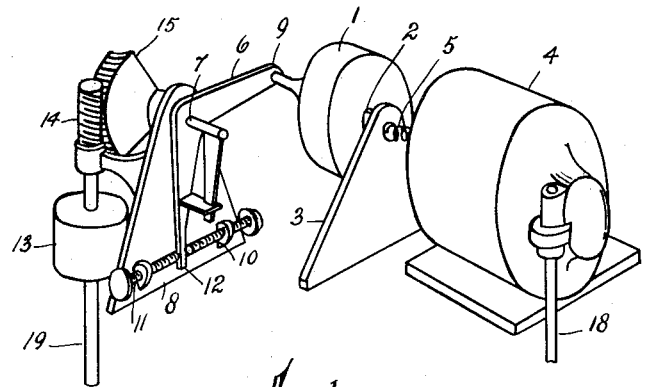
Figure 1 represents diagrammatically the mechanism for measuring $\theta'$ and represents the gyroscopic portion of the gear.
Figure 2:
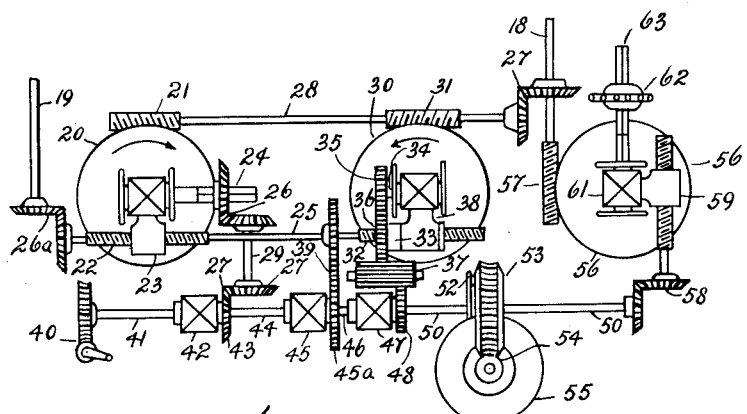
Figure 2 shows a diagrammatic representation of the integrator and differentiator and the mechanism for combining the three variables to give S.

The mechanism of the constrained gyroscope for measuring the angular velocity of the ship is shown somewhat diagrammatically in Fig. 1 and the integrator, differentiator and other gear are shown in diagrammatic developed plan in Fig. 2, the bedplate, bearings for the shafts and other obvious parts being omitted in order to make the description as clear as possible.

In Fig. 1 the gyroscope consists of a flywheel 1 mounted upon a central hollow spherical bearing 2 carried by the bracket 3 and is driven by the motor 4 through the flexible coupling 5 which passes through the hollow bearing. The angular motion of the gyro about its spherical bearing is constrained by the bell-cranked lever 6 mounted upon a pivot pin 7 carried by the bracket 8. The lever 6 engages with the rotating spindle of the gyro 1 in a bearing 9 of the spherical type. The rotor axis of the gyro can therefore only tilt up and down relatively to the deck, and this tilting motion is restricted to a fraction of a degree by two adjustable stops 10 and 11 engaging with the lower end 12 of the lever 6. The stops 10 and 11 act as electric contacts energizing the small motor 13 to run in one or other direction. This rotation drives the worm 14, fixed to the motor spindle 19, and the worm quadrant 15 which is carried on a bearing fixed to the bracket 8, and the quadrant 15 turns the pivot pin 7 with it and flexes the cantilever spring 16 which is rigidly clamped to the pin 7. The lower end of the spring 16 engages with a fork 17 rigidly fixed to the lever 6, hence the rotation of the motor 13 applies a spring force to the gyro through the bearing 9 and the motor is connected to the contacts 10 and 11 so that this force breaks the contact causing the rotation. The revolutions of the motor then measure the spring force which is proportional to the angular velocity of yaw of the ship. If L be the spring torque on the gyro, $\Omega$ the spin of the rotor, I the moment of inertia of the rotor and $\theta'$ the velocity of yaw of the ship, then $L = I\Omega\theta'$. The revolutions of the motor shaft 19 therefore measure $\theta'$ upon a certain scale.

The motor 4 drives also a shaft 18 at a constant speed which is used in the mechanism of Fig. 2 now to be described.

Fig. 2 represents a developed plan of the integrator and differentiator and the allied mechanism for obtaining S the quantity which is to control the rudder, and also shows two methods of utilizing S for this purpose. The integrator and differentiator are both shown as consisting of continuously variable speed gears consisting respectively of discs 20 and 30 driven at constant speeds by worm gears 21 and 31 mounted on the shaft 28 which is driven through gears 27 from the shaft 18 which, as is shown on Fig. 1 is driven by the motor 4 at constant speed. On each of these discs bears two rollers a and b which are interconnected by a differential gear in the box c. This type of variable speed gear is well known the variable speed being obtained from the epicyclic member of the differential gear by traversing the differential gear and the two rollers across the disc parallel to the axis of the rollers. The traversing motion of the rollers bearing on disc 20 is produced by a screw 22 gearing in a nut 23 fixed to the differential gear c, and the screw 22 is driven through gears 26a from the shaft 19 which is the shaft of the motor 13 of Fig. 1.

Since the number of revolutions of shaft 19 is proportional to the velocity of yaw of the ship $\theta'$, it follows that the number of revolutions of the epicyclic member of the differential gear or the shaft 24 connected to it is proportional to the time integral of $\theta'$, that is proportional to $\theta$ the angle of yaw.

In the differentiator, which I believe is of a novel type, the differential box c is traversed by the screw 32 which is mounted on the same shaft 25 as the screw 22, and engages with a nut 33 which in its turn is capable of rotation in a housing 38 attached to the box of the differential gear. The shaft 34 is attached to the epicyclic member of the differential gear and carries a pinion 35 which gears with another pinion 36 fixed to the nut 33, the lay of the screw 32 or the direction of rotation of disc 30 being so arranged that when the differential gear 38 is displaced in either direction by rotation of screw 32, the resulting movement of pinion 35 tends to restore the differential gear 38 to its zero position. The result of this arrangement is that the axial displacement of the differential gear across the disc 30 if the speed of the screw 32 is constant, is simply proportional to $\theta''$ because the nut 33 moves along the screw until its speed of rotation equals that of the screw 32 and since this speed is proportional to $\theta''$ the axial displacement is proportional to $\theta''$ the acceleration of yaw, and this axial displacement is given by the difference between the number of revolutions of the screw 32 and nut 33. With steady acceleration the screw 32 and nut 33 must be turning at the same speed and pinions 45a and 48 must also be turning at equal speeds in opposite directions, hence the velocity ratios of pinions 39 to 45a and 36 to 48 must be equal.

The quantity 8 which is to control the directing-couple-mechanism in this case the rudder, is given by, $$\theta'' + 2A\theta' + (A^2+B^2)\theta = S$$

involves the addition of the revolutions of the shafts 25 and 24 and the difference between the revolutions of screw 32 and nut 33 all in certain proportions, and an additional displacement is required in S to enable the steersman to change course or apply corrections at will. In Fig. 2 this hand adjustment is applied by the worm gear 40 to the shaft 41, the $\theta$ term is then added by a differential gear 42 the epicyclic member of which is driven from shaft 24 through gears 26 shaft 29 and bevels 27 and 43. It will be noticed that the bevel on shaft 24 is mounted on a square or splines on that shaft and does not partake of the translation of the shaft. The sum of the hand adjustment and the $\theta$ term is thus obtained on the shaft 44. Instead of then adding the revolutions of shaft 25 and the difference between the revolutions of 33 and 34 I can save a differential gear required to get the difference, by adding only the revolutions of shaft 25 and nut 33 separately.

The revolutions of shaft 25 which give the $\theta'$ term are added to those of shaft 44 by the differential gear 45 through spur gears 39 in a manner similar to that described for differential gear 42, the sum of three terms being obtained on shaft 46 and the revolutions of nut 33 are similarly subtracted by differential gear 47 through spur gears 36 and 48 interconnected by the long pinion 37, and the sum of the four terms, S plus hand adjustment is obtained on shaft 50.
In order that the rotation of the shaft 50 shall represent the above equation it is necessary that the gear ratios and speeds of discs be properly chosen. I have worked out these conditions and if $\alpha$, $\beta$ and $\delta$ represent the rotations of shaft 50 due respectively to $\theta$, $\theta'$ and $\theta''$ respectively, that is $\alpha$ represents the angular displacement of shaft 50 due to shaft 24, $\beta$ that due to shaft 25' and $\delta$ that due to the difference of speeds of the shaft 25 and the nut 33. Then since $\theta' = \omega_1 \beta$ where $\omega_1$ is a constant having the dimensions of an angular velocity and is the velocity of yaw of the ship which will cause the constrained gyro to turn shaft 50 through one radian, this constant is readily adjustable by means of the spring control on the gyro.

The angle $$\alpha = \omega_2 \int \beta . dr = \omega_2 \frac{\theta}{\omega_1}$$

where $\omega_2$ is a constant of the integrator 20, having the dimensions of an angular velocity being the angular velocity imparted to shaft 50 due to the integrator when the angular displacement of shaft 50 due to shaft 25 is one radian.

The angle $\delta$ is given by the equation $$\omega_3 \delta = \frac{d\beta}{dr} = \frac{\theta''}{\omega_1}$$

where $\omega_3$ is a constant of the accelerometer 30 having the dimensions of an angular velocity. It is the rate of increase of $\beta$ due to the speed of shaft 25, which will turn the shaft 50 one radian due to the compensating velocity of the nut 33.

Since $$S = \theta'' + 2A\theta' + (A^2+B^2)\theta$$

we have by substitution from the above equations $$S = \omega_1\omega_3\delta + 2A\omega_1\beta + (A^2+B^2)\frac{\omega_1\alpha}{\omega_2} =$$
$$\omega_1\omega_3\delta + 2A\beta/\omega_3 + (A^2+B^2)\frac{\alpha}{\omega_2\omega_3}$$

whereas if $$2A = \omega_3$$

and $$A^2+B^2 = \omega_2\omega_3, \quad S = \omega_1\omega_3(\alpha+\beta+\delta)$$

and $$\omega_2 = (A^2+B^2)/2A$$

Hence as soon as the particular damped oscillation in which the ship is required to move is chosen, A and B are fixed and both $\omega_2$ and $\omega_3$ are also fixed.

The particular damped oscillation which I prefer is that in which $B=A$ which gives a damping coefficient $\omega^{-r} = 0.04$ in half a period so that in each half period the amplitude of the deviation is reduced to 4 per cent of the prior maximum or if the ship were 10° off her course to port, she would yaw only twenty four minutes to starboard when returning to her course or for all practical purposes the yaw is damped out in half a period. If I assume a period of 30 seconds, $B=A=2\pi/30$ secs., $\omega_2=A$ and $\omega_3=2A$. All three angles $\alpha$, $\beta$, and $\delta$ are affected inversely in the same ratio by $\omega_1$, hence I may conveniently use $\omega_1$ as the adjustment for changing all the terms in S in equal proportions until the required damped oscillation results. I may conveniently do this by altering the spring control on the gyro. This adjustment will obviate the necessity of changing the gear ratio between the relay mechanism, and the motor which actuates the steering gear in different ships and enables one to alter the period of the damped oscillation very easily.

The method of applying S to control the rudder depends upon the particular type of steering gear fitted to the ship and also upon the choice of method of actuating it; that is, whether upon a displacement or velocity basis. Fig. 2 illustrates both methods.

If the method is upon a displacement basis, the shaft 50 carries a contact arm 51 bearing upon a two-part commutator 52 attached to a worm-wheel 53, which is turned by the worm 54 driven by the motor 55. The electric contacts 51, 52 actuate the motor 55 causing the wheel to follow the motion of the shaft 50 and the motor 55 drives the steering gear of the ship in the usual manner. This would produce a motion of the rudder proportional to S, whereas on my system I prefer that the motion of the rudder shall continue until S is zero or very small. I prefer therefore to make the velocity of the tiller proportional to S. Several types of steering gear such as the Waterbury or the Hele Shaw are used to which my system is easily applicable. In these types the rudder is moved by a continuously variable speed gear from a motor running at constant speed, in which case I actuate the arbor which varies the speed directly from the shaft 50. This is illustrated diagrammatically in Fig. 2. The continuously variable speed gear 56 which is shown of the same type as 20 and 30 but would naturally be of more robust construction to transmit the power required, has its disc 56 rotated continuously by the worm 57 on shaft 18 and the differential box 61 and its accompanying rollers is translated by the screw 60 engaging in the nut 59 the screw being rotated by the shaft 50 through the bevel gears 58. The shaft 63 attached to the epicyclic member of the differential gear 61 carries a chain sprocket which transmits the action to the steering gear directly or to the shaft of the telemotor gear. The motor 55 may also be used to transmit a velocity proportional to S by displacing the steam valve of a steam steering engine independently of the hand control gear by an amount proportional to S. The best system would have to be designed to suit the particular local conditions.

When the gyro in Fig. 1 makes contact at one or other of the stops 10 or 11 a change in the velocity of yaw of the ship is indicated and is measured by the turns of the motor 13 required to break the contact. The cause of the change of velocity of yaw however is a couple on the ship due to external causes or to the helm, and such torque is not of momentary duration, hence the velocity of yaw is being accelerated or decelerated and such acceleration should be indicated by a continuous revolution of the motor 13 instead of by the spasmodic revolution introduced by the contacts alone. The gear will therefore work better if the revolutions of the motor are maintained even when the contacts are broken, and this revolution should be maintained by the accelerometer in Fig. 2. The contacts 10 and 11 would then be employed in changing the speed of the motor shaft 19 and not in starting and stopping it and the contacts would have much less work to do.

Figure 3:
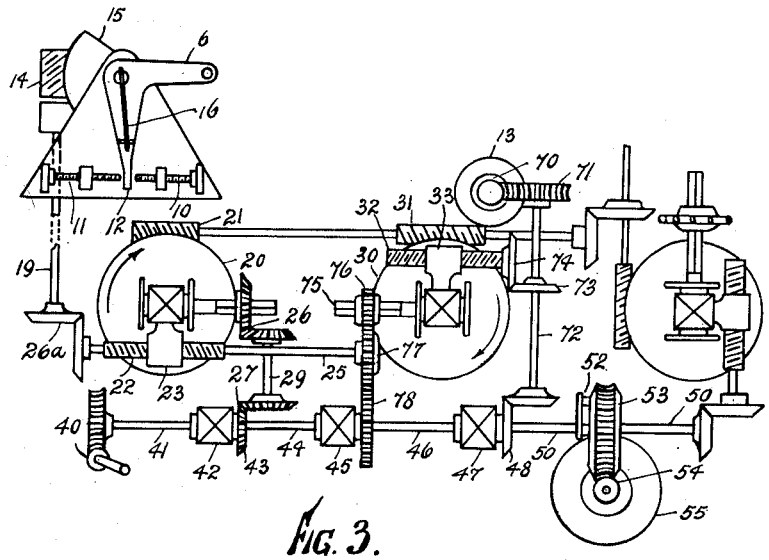
Figure 3 shows an alternative method of actuating the mechanism for measuring the angular velocity and the angular acceleration to obviate constant making and breaking of the motor contacts and to improve the accuracy of both measurements.

Figure 3 illustrates a method of achieving this result. Part of both Figures 1 and 2 are shown in it, the contact mechanism and spring torque mechanism of the former and the whole of the latter except for the alterations in the accelerometer and its control. The various parts which occur in Figures 1 and 2 are referred to by the same reference numerals in Fig. 3. The motor 13 which in Fig. 1 actuates the worm 14 of the spring torque mechanism on the gyro control, is now removed from the shaft 19 to actuate the transverse of the accelerometer differential gear. In Fig. 3 the motor 13 is shown driving a worm 70 which gears with the worm wheel 71 fixed to the shaft 72, which carries the bevel pinion 73 gearing with a similar pinion 74 fixed to the traversing screw 32 of the accelerometer variable speed gear 30. The shaft 75 of this gear is turned by the epicyclic member of the differential gear and carries the spur pinion 76 on splines so that the translation of the shaft 75 is not imparted to that pinion. The pinion 76 gears with a pinion 77 on shaft 25 which turns with the integrator screw 22, and the pinion 77 gears with a pinion 78 which turns the epicyclic member of the differential gear 45. The motor 13 is controlled as before from the contacts between 12 and 10 or 11.

When one or other of these contacts is made the motor starts and traverses the nut 33 by turning the screw 32. The shaft 75 then turns and causes the shaft 25 to turn. The motion of the shaft 25 is transmitted through gears 26a to shaft 19 and thence through the worm gear 14, 15 causing a flexing of the spring 16, thereby applying a torque to the gyro and breaking the contact. It will be apparent that rotational displacement of the motor 13 will produce a speed of the shaft 19 proportional to it hence this shaft will not be starting and stopping as each contact is made but will only have its speed changed at each contact, which is just what is required. If the directions of rotation of the disc 20 and 30 are as indicated in Figs. 2 and 3 the displacement, velocity and acceleration terms will be properly added together as regards sign if the screws are of the hands indicated in these figures. The conditions regarding velocity ratios in Fig. 3 are the same as those already given for Fig. 2, 1, 2 and 3 having the same significance in both figures. The rate of increase of $\beta$ due to shaft 25 is obviously given in Fig. 3 by the rotation of the shaft 72 by the motor 13.

In order to prevent the pitching of the ship from affecting the steering gear through the gyro control, I balance the gyro rotor 1 Fig. 1 on its spherical bearing 2 and I balance the lever 6 on its fulcrum 7 by means of suitable weights, I remove all backlash from the bearings 2 and 9 by spring loaded ball races and I arrange the stiffness of the spring 16 and the clearance between the contacts 10 and 12 and 11 and 12, so that when the gyro is not rotating and the ship is pitching heavily neither contact will be closed. It is easy to calculate the stiffness of the spring 16 required to prevent contact in any given condition of pitching and setting of contacts. I then calculate the speed of rotation of the gyro so that contact will be made by the smallest angular velocity of yaw I wish to measure. If for example the ship is pitching 10 degrees up and down with a 7 second period the maximum acceleration is roughly 8 deg./sec.², and the couple required to make the gyro pitch with the ship is C times that acceleration, where C is the moment of inertia of the rotor about a diameter of the rotor. This couple is to be supplied by the spring just when contact is being made.

The maximum gyroscopic couple required to be exerted by the spring is probably that required to make the rotor yaw with the ship at, say, 10 degrees per second, or $L=I\Omega 10°/\text{sec}$. The ratio of the two couples is $I\Omega 10\text{sec.}/8C$. The ratio of I to C is necessarily less than two with a gyro of this simple form. if the flywheel were a sphere the ratio would be unity, hence the ratio of the two couples is greater than $10\Omega\text{sec.}/8$, or if the speed were 4000 revs. per min. or roughly 400 radians per second, the minimum ratio of the couples would be 500, or the separation of the contacts would be 1/500 of the maximum spring deflection, and contact would be made by a yawing velocity of about one minute of arc per second. It will be evident that although the spring 16 applying the couples to the gyro is shown as a cantilever, when a maximum deflection equal to 500 times the distance between the contacts has to be used it may be better mechanically to employ a helical spring, thereby reducing friction and secondary constraints of the spring.

Figure 4:
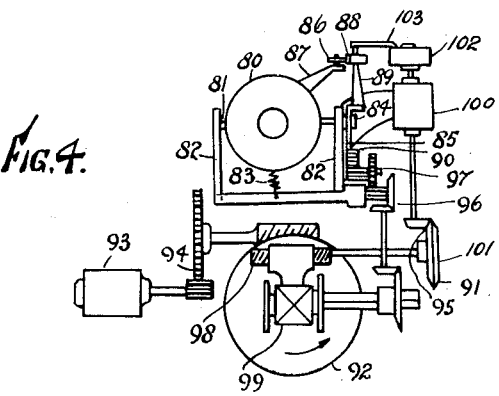
Figure 4 represents an alternative form of angular accelerometer which I may use and which employs the conventional type of angular velocity meter.

The conventional type of angular velocity meter is illustrated in Fig. 4 by the gyroscope in its case 80, mounted upon trunnions 81 in a frame 82 and constrained in its tilting motion about the trunnions 81 by a tension spring 83 between the case 80 and frame 82. The tilt of the case 80 relative to the frame 82, when the gyro is running, is approximately proportional to the angular velocity of the frame 82 about the vertical axis of the figure, so long as that tilt is small.

On a trunnion 84 fixed to the frame 82 coaxial with 81, I pivot a follower 85 to follow the tilt of the gyroscope, the control of the follower being actuated by a roller contact 86 mounted on an arc 87 fixed to the gyro case and engaging with a two-part commutator 88 attached to the follower by a stiff flat spring 89 encastré in the follower 85. The follower 85 is driven through a toothed quadrant 90 by the variable speed shaft 91 of the continuously variable speed gear 92, which is shown of the same disc type as has already been described, the disc in this case being driven by a separate motor 93 through gearing 94. The drive 91 to 95 is taken through bevel gears 95 and 96 and double reduction spur gears 97. The variation of the speed of the shaft 91 is brought about by turning the screw 98 which traverses the box of the differential gears 99 and this is done by the motor 100, mounted on a bracket on the frame 82, the motor driving screw 98 through bevel gears 101. The motor 100 is controlled from the roller contact 86.

When the gyro tilts, contact is made by 86 and the motor 100 starts to run, which displaces gears 99 and starts the shaft 91 so that it drives the follower 85 in the direction to follow the contact 86 and it continues to follow until the contact breaks. The speed of the shaft 91 then represents the angular acceleration and this is simply proportional to the angular displacement of the screw 98 or the shaft of the motor 100, and the angular velocity is simply proportional to the angular displacement of the shaft 91. The mechanism therefore measures both the angular velocity and the angular acceleration of the frame 82 about the vertical axis of the figure.

In order to reduce the tendency of the motor 100 to hunt due to its inertia, I advance the commutator 88 relatively to the follower 85 by an amount depending upon the motor speed and preferably proportional thereto. I mount a frictional brake of the viscous or eddy current type on the end of the motor spindle, the outer case of the brake being shown. This case 102 is prevented from turning with the motor spindle by an arm 103 rigidly attached to it, engaging with the upper end of the cantilever spring 89. The viscous drag on the case 102 when the motor runs causes an advance of the breaking of the contact and this advance can be adjusted by choosing the spring stiffness to suit the brake constant, and the inertia of the motor.

I claim:—

1. For use on a dirigible body provided with directional controlling means to control angular movements of the body about an axis fixed relatively to the body, a relay for actuating said controlling means comprising an element movable in proportion to the angular velocity of the body about said axis, a differentiator having an input member actuated by said element and having an output member movable in proportion to the angular acceleration of the body about said axis, an integrator having an input member actuated by said element and an output member movable in proportion to the angular displacement of the body about said axis, differential means to add together the displacements of the said element and said two output members in predetermined ratios, and means to apply the algebraic sum to the said controlling means.

2. For use on a dirigible body provided with directional controlling means to control angular movements of the body about an axis fixed relatively to the body, a relay for actuating said controlling means comprising an element movable in proportion to the angular velocity of the body about said axis, a differentiator having an input member actuated by said element and having an output member movable in proportion to the angular acceleration of the body about said axis, an integrator having an input member actuated by said element and an output member movable in proportion to the angular displacement of the body about said axis, a manually adjustable part, differential means to add together the displacements of said element, said two output members and said adjustable part in predetermined ratios, and means to actuate said directional controlling means in proportion to the alegbraic sum of said displacements.

3. For use on a dirigible body provided with directional controlling means to control angular movements of the body about an axis fixed relatively to the body, a relay for actuating said controlling means comprising an element movable in proportion to the angular velocity of the body about said axis, a differentiator having an input member actuated by said element and having an output member movable in proportion to the angular acceleration of the body about said axis, an integrator having an input member actuated by said element and an output member movable in proportion to the angular displacement of the body about said axis, differential means to add together the displacements of the said element and said two output members in predetermined ratios and means to actuate said directional controlling means at a rate proportional to the algebraic sum of the said displacements.

4. In a relay mechanism of the type described for use on an angularly movable body, a continuously variable speed gear having a constant speed member, an input element and an output element, said input element being movable to vary the rate of movement communicated by the constant speed member to the output element, a part movable in proportion to the angular velocity of the body about a particular axis, means to move the input element in proportion to the movements of said movable part and a connection between the said input and output elements tending to annul the movement of the input element, whereby the speed of the output element and the displacement of the input element are proportional to the angular acceleration of the body.

5. In a relay of the type described for use on a directionally controllable body in combination with a gyroscope mounted on the body so as to be sensitive to angular movements of the body about a particular axis and maintained in predetermined relation to said axis by torques proportional to the angular velocity of the body about said axis, movable means for applying said torques, said means having movement proportional to said angular velocity, two continuously variable speed gears each comprising a constant speed member, an input element and an output element, said input elements being movable in proportion to the movement of said movable means, one of said gears being arranged as an integrator to displace its output element in proportion to the angular displacement of the body, and the other gear being arranged as a differentiator by having a differential connection between its output and input elements tending to annul the displacement of the input element whereby the displacement of the output element is proportional to the angular acceleration of the body, and means to add together algebraically the displacements of the said movable means, integrator output element and differentiator input element in predetermined proportions.

6. In a mechanism of the type described for use on an angularly moving body, a constrained gyroscope mounted on the body so as to be sensitive to certain angular movements of the body and controlled in predetermined relation to the body by a movable torque mechanism having movement in proportion to the angular velocity of said movements of the body, and a relay comprising a continuously variable speed gear having a constant speed member, an input element and an output element, means controlled by the gyroscope for moving the said input element, a second similar variable speed gear, means to move its input element and the movable torque mechanism in proportion to the displacement of the output element of the first variable speed gear, and means to combine in predetermined proportions the displacements of the input and output elements of the first variable speed gear and the output element of the second.

7. In a relay of the type described for use on an angularly moving body, means movable in proportion to $\theta'$ (the angular velocity of the body about a predetermined axis), an integrator having an input element actuated by said movable means in proportion to $\theta'$ whereby its output element is moved in proportion to $\theta$ (the angular displacement of the body about said axis), a differentiator comprising a continuously variable speed gear having an input element, an output element and a constant speed member, said input element being movable differentially by said movable means and by last said ouput element, whereby the movement of the last said input element is proportional to $\theta''$ (the angular acceleration of the body about said axis), and means to combine the said displacements proportional respectively to $\theta$, $\theta'$ and $\theta''$ in accordance with the equation $$S = \theta'' + 2A\theta' + (A^2 + B^2)\theta$$

wherein A and B are constants.

8. In a mechanism of the type described for use on an angularly moving body, a constrained gyroscope sensitive to angular movements of the body about a predetermined axis and controlled in predetermined relation to the body by externally applied torques proportional to the angular velocity of the body about said axis, a movable mechanism for applying said torques, two variable speed gear integrators each comprising a constant speed member, a movable input element and an output element adapted to be moved by the constant speed member at a speed proportional to the displacement of the input element and by an amount proportional to the time integral of the displacement of said input element, means controlled by the gyroscope for moving the input element of one of said integrators, and means for moving the input element of the second integrator and the said torque mechanism in proportion to the movement of the output element of the first integrator, whereby as the movement of the said torque mechanism is proportional to $\theta'$ (the angular velocity of the body about said axis), the movement of the output element of the said integrator is proportional to $\theta$ (the angular displacement of the body about said axis), and the movement of the input element of the first integrator is proportional to $\theta''$ (the angular acceleration of the body about said axis), and means to combine the movements of the input and output elements of the first integrator and the output element of the second in accordance with the equation $$S = \theta'' + 2A\theta' + (A^2 + B^2)\theta$$

wherein A and B are constants.

JAMES BLACKLOCK HENDERSON.